United States Patent

Wetzel

[11] Patent Number: 5,957,548
[45] Date of Patent: Sep. 28, 1999

[54] ELECTROHYDRAULIC UNIT FOR REGULATING BRAKE PRESSURE IN A MOTOR VEHICLE BRAKE SYSTEM

[75] Inventor: Gerhard Wetzel, Korntal-Muenchingen, Germany

[73] Assignee: Robert Bosch GmbH, Stuttgart, Germany

[21] Appl. No.: 08/913,467

[22] PCT Filed: Feb. 17, 1996

[86] PCT No.: PCT/DE96/00247

§ 371 Date: Sep. 16, 1997

§ 102(e) Date: Sep. 16, 1997

[87] PCT Pub. No.: WO96/28327

PCT Pub. Date: Sep. 19, 1996

[30] Foreign Application Priority Data

Mar. 16, 1995 [DE] Germany .................. 195 09 556

[51] Int. Cl.[6] ............................................. B60T 8/36
[52] U.S. Cl. .................. 303/119.3; 303/119.2; 303/116.4; 439/34
[58] Field of Search ............. 303/116.4, 119.2, 303/119.3; 439/34, 71, 289, 700, 840

[56] References Cited

U.S. PATENT DOCUMENTS 5,137,455  8/1992  Moerbe et al. ....................... 439/34
5,466,055  11/1995  Schmitt et al. ...................... 303/119.3
5,658,056  8/1997  Rischen et al. ...................... 303/119.2

Primary Examiner—Robert J. Oberleitner
Assistant Examiner—Mariano Sy
Attorney, Agent, or Firm—Edwin E. Greigg; Ronald E. Greigg

[57] ABSTRACT

The invention relates to an electrohydraulic unit for regulating the brake fluid pressure of a motor vehicle. The device includes a hydraulic block, on whose one side an electric motor is affixed. The electric motor includes electrical connections which protrude through the hydraulic block to an opposite side of the block and are connected there to electrical conductors of a mounted control device that covers the electrical conductors. For a simple contacting of the electrical connections, the conductors are helical wound around guide pins, which protrude into blind bores in the hydraulic block for the positioning of the mounted control device on the hydraulic block during assembly so that free ends of the electrical conductors reach into forked ends of the connecting pins before the mounted control device covers the connections. Contact points are therefore accessible for the production of an electrical connection during the assembly.

13 Claims, 2 Drawing Sheets

ELECTROHYDRAULIC UNIT FOR REGULATING BRAKE PRESSURE IN A MOTOR VEHICLE BRAKE SYSTEM

PRIOR ART

The invention is based on an electrohydraulic unit for regulating brake fluid pressure in motor vehicle brake systems. The invention also relates to a process for assembling an electrohydraulic unit.

An electrohydraulic unit of this kind for regulating brake fluid pressure in motor vehicle brake systems as well as a process for assembling the electrohydraulic unit has been disclosed by WO,A,94/27045, FIG. 10, which defines the species.

In that instance, a hydraulic block is provided on whose one side an electric motor is affixed and on whose other opposite side, a control and regulation electronic device is affixed. Electrical connections of the electric motor, which are embodied as rigid, extend through the hydraulic block with an insulated section. An insulation-free end section of the electrical connections of the electric motor engages in the interior of the control and regulation electronic device, between electrical conductors disposed there, which belong to connections of other electrical components. The electrical components are guided on the hydraulic block in conductor guides lateral to the attachment direction of the control and regulation electronic device. When the control and regulation electronic device is affixed to the hydraulic block provided with the electric motor, the insulation-free end section of the electrical connections of the electric motor engages between two electrical conductors of the connections of other electrical components and splays the electrical conductors lateral to the attachment direction. The contact between the insulation-free end sections of the electrical connections of the electric motor and the electrical conductors of the connections of other electrical components is therefore based merely on frictional, non-positive adhesion and takes place in the interior of the control and regulation electronic device shortly before this comes to rest against the hydraulic block. A visual control of this process is only possible with difficulty.

DE,A,41 33 879 has furthermore disclosed a unit of this type. This unit has a hydraulic block, i.e. a component provided with fluid conduits and fluid chambers provided as damper or storage chambers and equipped, for example, with electromagnet valves, which component is used for hydraulically connecting and mechanically attaching components of the brake system. In the known unit, an electric motor is mounted on one side of the hydraulic block and is for driving a fluid pump disposed in the hydraulic block. Electrical connections of the electric motor, which are embodied as rigid, protrude through the hydraulic block on its opposite side, where the electromagnet valves are affixed. As a result, electrical connections of the components of the known unit are disposed together on one side of the hydraulic block.

The electrical connections are covered by a connecting piece that can be affixed to the hydraulic block and by means of which the components can be electrically connected to other components. The connecting part can have multipoint connectors for this purpose. The connecting piece is pivotably guided on the hydraulic block. In a pivoted position, the electrical connections are accessible and can, for example, be soldered to flexible lines of the connecting piece. The connections can be optically controlled. Then, the connecting piece is pivoted so that it rests against the hydraulic block, where it covers the electrical connections of the electromagnet valves and the electric motor, and is connected to the hydraulic block.

Before the soldering, in the known unit, the flexible lines of the connecting piece must be brought into contact with the electrical connections of the components affixed to the hydraulic block, which entails the expenditure of effort.

ADVANTAGES OF THE INVENTION

The electrohydraulic unit according to the invention has the advantage that the electrical conductors of its connecting piece are guided in the attachment direction of the connecting piece on the hydraulic block, which direction is predetermined by means of assembly guides. In this manner, the electrical conductors of the connecting piece come into contact with the electrical connections of at least the electric motor when the connecting piece is brought into the assembly guides. In an assembled position of the connecting piece, the contact points are accessible and can, for example, be welded and optically controlled. The contacting takes place in a simple manner and is suited for automation. The construction costs for the guidance of the conductors of the connecting piece are low. Then the connecting piece is brought into contact with the hydraulic block and is attached to it. It covers the electrical connections.

The rigidly embodied connections of the electric motor are disposed inside a sealing ring which is disposed on an end face of the electric motor that rests against the hydraulic block. In the connecting piece, the electrical connections of the electric motor are disposed inside a chamber sealed off from the connecting piece on the hydraulic block. This brings with it the advantage that no separate seal is required for the electrical connections of the electric motor.

Moreover, connecting the electrical connections of the electrical motor to the conductors of the connecting piece requires no additional space since they are disposed on the inside of the connecting piece or inside the end face of the electric motor.

According to the invention, the electrical conductors of the connecting piece are helically wound around guide pins of the connecting piece, which engage in bores in the hydraulic block. In this manner, the conductors are guided in the attachment direction of the connecting piece on the hydraulic block, which direction is predetermined by means of the guide pins that engage in the bores in the hydraulic block.

In carrying out the invention free ends of the conductors, which are to be contacted with the electrical connections of the electric motor, protrude through longitudinal slots in the guide pins, thus the guidance of the conductors on the connecting piece becomes more exact.

A process for assembling an electrohydraulic unit according to the invention is set forth hereinafter.

BRIEF DESCRIPTION OF THE DRAWINGS

The invention will be explained in detail below in conjunction with an exemplary embodiment shown in the drawings.

DESCRIPTION OF THE PREFERRED EMBODIMENTS

Figure 1:
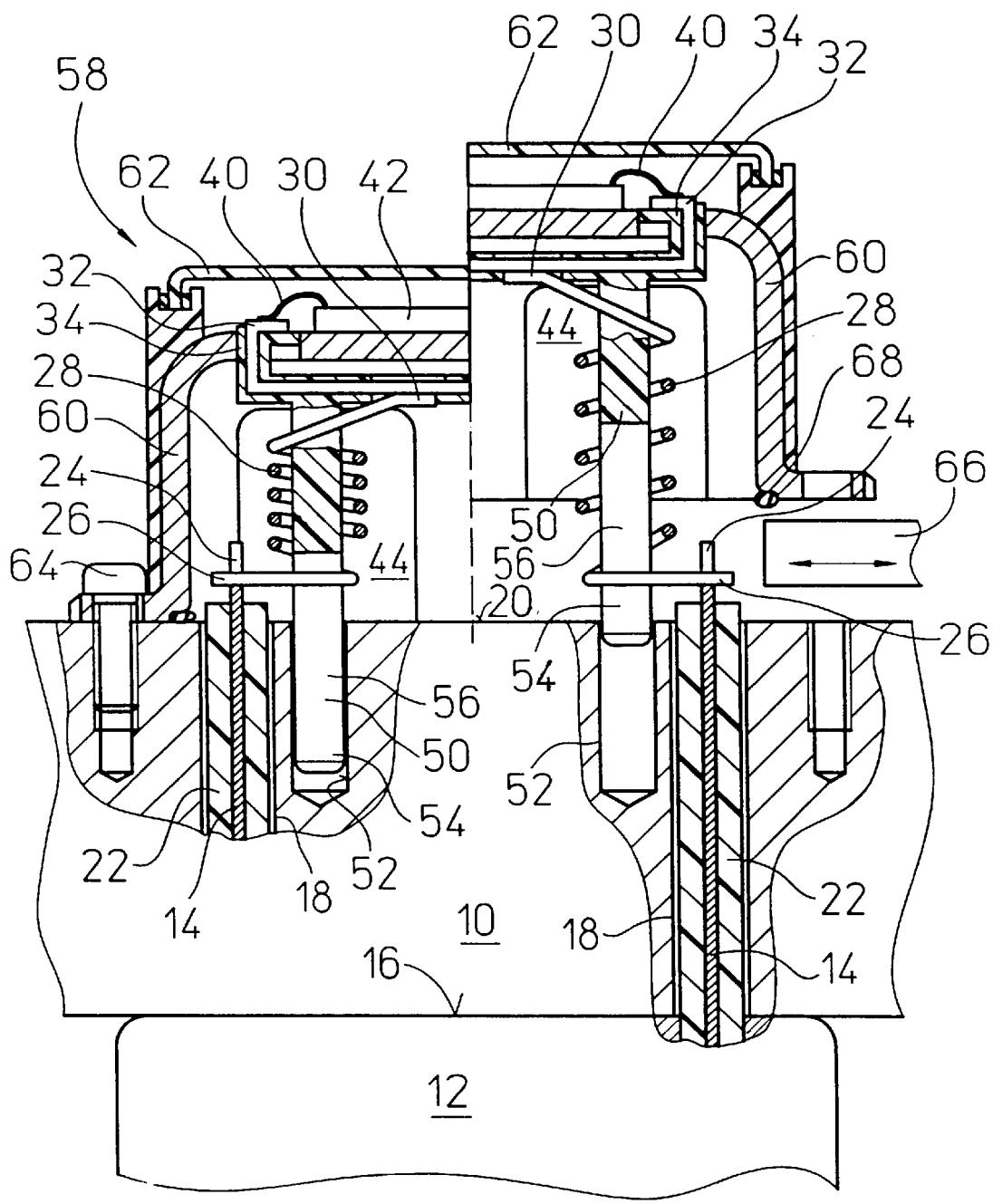
FIG. 1 shows a partially sectional side view of an electrohydraulic unit according to the invention, wherein the left half of the picture shows the completed state and the right half of the picture shows a pre-assembly position.

The Figs. show an electrohydraulic unit for regulating the brake fluid pressure in motor vehicle brake systems according to the invention. It has a hydraulic block 10, on one side of which is mounted an electric motor 12 for driving a fluid pump which is disposed in the hydraulic block 10 and is not shown in the drawings. Connecting pins 14 of the electric motor 12 are disposed on its end face 16 oriented toward the hydraulic block 10. They are embodied as metal pins that are disposed vertically on the end face 16 and are slightly longer than the hydraulic block 10 in thickness. They protrude through two through bores 18 in the hydraulic block 10 and protrude on its side 20 opposite the electric motor 12. In the region in which the connecting pins 14 are disposed inside the hydraulic block 10, they are electrically insulated, for example by a plastic sleeve 22 being slid onto them or by being extrusion coated with plastic.

Protruding from the plastic sleeve 22 and the hydraulic block 10, the ends 24 of the connecting pins 14 remote from the electric motor 12 are embodied in the shape of forks and are used to electrically connect the electric motor 12. A protruding end 26 of a electrical conductor 28 comprised of conductor wire is inserted into the forked ends 24 and is welded to it.

Another, likewise protruding end 30 of the electrical conductor 28 is welded to a stamped screen 32 that is disposed parallel to and spaced apart from the side 20 the hydraulic block 10 remote from the electric motor 12, on which side the forked ends 24 of the connecting pins 14 of the electric motor 12 protrude. The stamped screen 32 has sheet-metal strips that are insulated from one another and constitute strip conductors for connecting electrical components of the electrohydraulic unit according to the invention. The stamped screen 32 is extrusion coated with plastic 34 which electrically insulates the individual strip conductors of the stamped screen 32 from one another.

Figure 2:
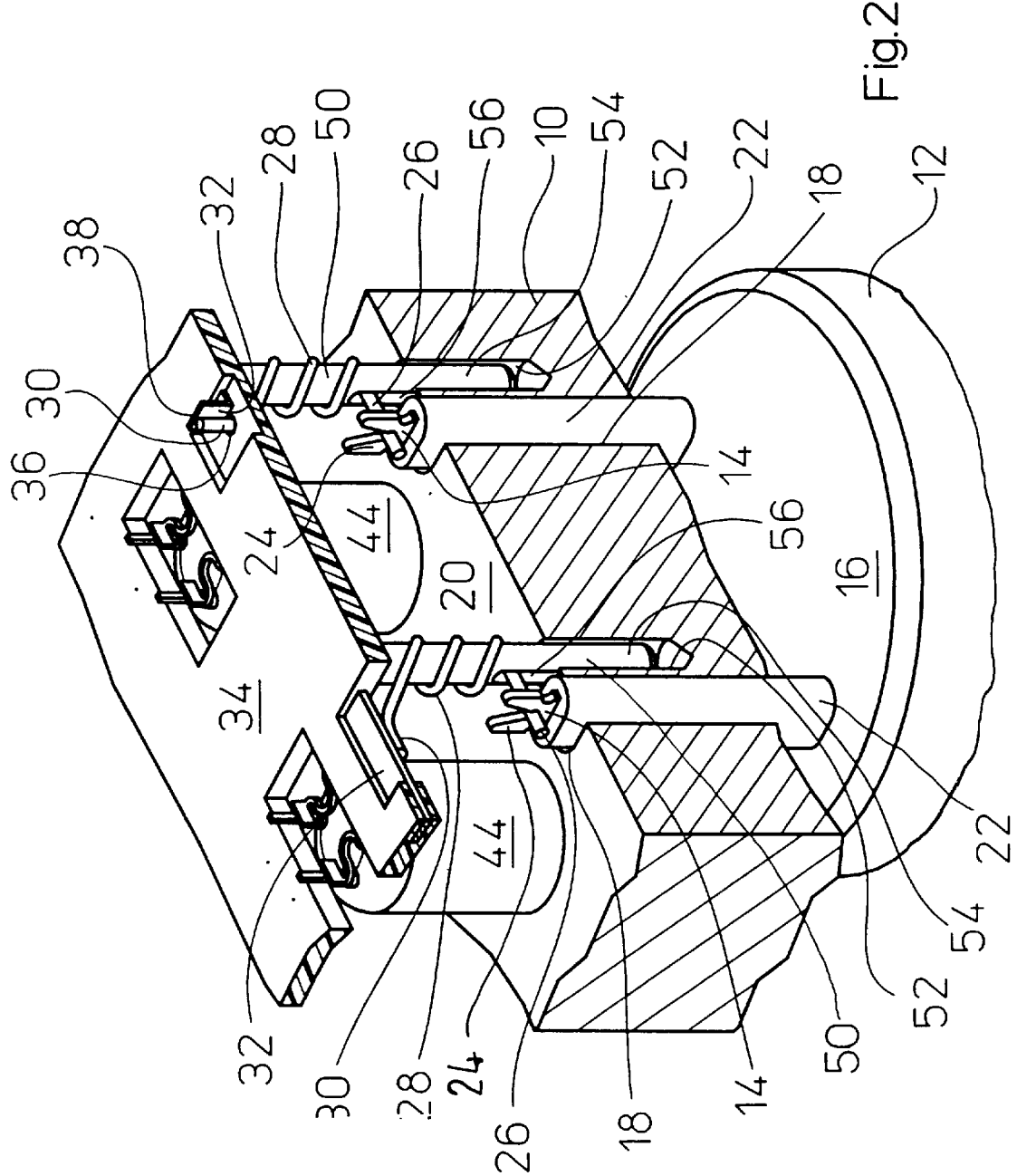
FIG. 2 shows a perspective section from FIG. 1 in the region of electrical connections, not according to scale.

Two possible connections of the electrical conductors 28 with strip conductors of the stamped screen 32 are shown by way of example in FIG. 2. These are not coated with plastic 34 in the contacting region. The end 30 of the electrical conductor 28 shown on the left in FIG. 2 rests flush against the stamped screen 32 and is welded to it. The end 30 of the electrical conductor 28 shown on the right in FIG. 2 protrudes through a hole 36 in the plastic 34; it is disposed perpendicular to a plane in which the stamped screen 32 is essentially disposed. A tongue 38 of a strip conductor of the stamped screen 32 is angled perpendicularly upward; the end 30 of the electrical conductor 28 rests against it and is welded to it. Normally, all electrical connecting points between the electrical conductors 28 and the stamped screen 32 are embodied in the same manner as is shown in FIG. 1.

Strip conductors of the stamped screen 32 are connected by means of contact tabs 40 to an electronic control circuit or regulating circuit 42 cast in plastic, which is disposed spaced slightly apart via the stamped screen 32. The FIG. 2, the electronic circuit 42 is left out for better visibility. The strip conductors of the stamped screen 32 are also connected in an electrically conducting manner to magnet coils 44 of electromagnet values disposed on the hydraulic block 10.

Two cylindrical guide pins 50 are molded onto the plastic 34, of one piece with the plastic 34 that covers the stamped screen 32. They protrude into cylindrical blind bores 52 that are let into the hydraulic block 10 parallel to the through bores 18 that receive the connecting pins 14 of the electric motor 12, that is they are disposed perpendicular to the side 20 of the hydraulic block 10 opposite from the electric motor 12. The two electrical conductors 28 encompass the guide pins 50; they are guided by the guide pins 50. Free ends 54 of the guide pins 50 have a longitudinal slot 56 through which the protruding ends 26 of the electrical conductors 28 are laterally guided, which are welded to the connecting pins 14 of the electric motor 12. The slots 56 form guides for these ends 26 of the electrical conductors 28.

The magnet coils 44, together with the electronic circuit 42, constitute an electrical mounted control device 58, which is accommodated in a housing 60 that is covered with a glued-on cover 62. The mounted control device 58 is positioned on the hydraulic block 10 by means of the guide pins 50 and is screwed to it by means of screws 64.

The assembly of the electrohydraulic unit according to the invention takes place in the following manner: after the electric motor 12 has been affixed to the hydraulic block 10, wherein its insulated connecting pins 14 have been slid through the hydraulic block 10, the mounted control device 58 is attached to the hydraulic block 10 on the opposite side 20. First the free ends 54 of the guide pins 50 reach into the blind bores 52 in the hydraulic block 10, by means of which the mounted control device 58 is positioned in relation to the hydraulic block 10. At the same time, the ends 26 of the electrical conductors 28, which have still been free up to this point, reach into the fork-shaped ends 24 of the connecting pins 14 of the electric motor 12 when the housing 60 of the control device 58 is still disposed spaced apart from the hydraulic block 10 (right half of the picture in FIG. 1).

In this position, the ends 24, 26 of the electrical conductors 28 and the connecting pins 14 to be connected to one another are easily accessible from the side of the housing 60 of the mounted control device 58 so that they can easily be welded by means of welding tongs 66. The welding can be optically controlled in this position. After the welding, the welding tongs 66 are removed, the mounted control device 58 is pressed against the hydraulic block 10 and is screwed to it. The electrical conductors 28 assure the necessary path compensation for the attachment of the mounted control device 58.

All electrical connections are covered by the housing 60 of the control device 58, which is sealed in relation to the hydraulic block 10 by means of an inserted seal 68. The invention permits the electrical connections to be simply and reliably produced.

In lieu of the mounted control device 58, a multipoint connector, for example, can also be connected in the same manner to the connecting pins 14 of the electric motor 12 and affixed to the hydraulic block 10.

The foregoing relates to preferred exemplary embodiments to the invention, it being understood that other variants and embodiments thereof are possible within the spirit and scope of the invention, the latter being defined by the appended claims.

I claim:

1. An electrohydraulic unit for regulating brake fluid pressure in motor vehicle brake systems, comprising a hydraulic block (10), an electric motor (12) which is affixed to one side (16) of the hydraulic block (10) and whose electrical connections (14) are embodied as rigid, said electrical connections protrude through bores (18) in the hydraulic block (10) with an insulated section (22) within said hydraulic block, a connecting piece for connecting an insulation-free end section (24) of the electrical connections (14) of the electric motor (12) to other electrical components, wherein the connecting piece has flexibly embodied electrical conductors (28) and conductor guides (50, 56) by means of which the electrical conductors (28) are guided, when these electrical conductors come into contact with the insulation-free end sections (24) of the electrical connections (14) of the electric motor 12 while the connecting piece is being affixed to the hydraulic block (10), which connections are covered by the connecting piece affixed to the hydraulic block (10), an assembly guide (50, 52) is provided in the connection piece and in the hydraulic block (10), which guides the connecting piece when the connecting piece is being affixed to the hydraulic block (10), the conductor guides (50, 56) of the connecting piece belong to the assembly guide (50, 52), the electrical conductors (28) of the connecting piece are flexible in the attachment direction of the connecting piece is affixed to the hydraulic block (10), the electrical conductors (28) are affixed to the insulation-free end sections (24) of the electrical connections (14) of the electric motor (12) before the connecting piece covers the insulation-free end sections (24) of the electrical connections (14) of the electric motor (12).

2. A unit according to claim 1, in which the insulation-free end sections (24) of the electrical connections (14) of the electric motor (12) are embodied as fork-like.

3. A unit according to claim 1, in which the electrical conductors (28) of the connecting piece are helically wound around guide pins (50) which constitute conductor guides (50, 56), and that the guide pins protrude into bores (52) in the hydraulic block (10).

4. A unit according to claim 2, in which the electrical conductors (28) of the connecting piece are helically wound around guide pins (50) which constitute conductor guides (50, 56), and that the guide pins protrude into bores (52) in the hydraulic block (10).

5. A unit according to claim 3, in which free ends (26) of the electrical conductors (28) protrude laterally through longitudinal slots (56) in the guide pins (50).

6. A unit according to claim 4, in which free ends (26) of the electrical conductors (28) protrude laterally through longitudinal slots (56) in the guide pins (50).

7. A unit according to claim 1, in which the connecting piece has a mounted control device and a housing that covers the electrical connections (14) of the electric motor (12) when completely assembled.

8. A unit according to claim 2, in which the connecting piece has a mounted control device and a housing that covers the electrical connections (14) of the electric motor (12) when completely assembled.

9. A unit according to claim 3, in which the connecting piece has a mounted control device and a housing that covers the electrical connections (14) of the electric motor (12) when completely assembled.

10. A unit according to claim 4, in which the connecting piece has a mounted control device and a housing that covers the electrical connections (14) of the electric motor (12) when completely assembled.

11. A unit according to claim 5, in which the connecting piece has a mounted control device and a housing that covers the electrical connections (14) of the electric motor (12) when completely assembled.

12. A unit according to claim 6, in which the connecting piece has a mounted control device and a housing that covers the electrical connections (14) of the electric motor (12) when completely assembled.

13. A process for assembling an electrohydraulic unit which comprises securing a motor (12) to a hydraulic block (10), during securing said motor to said hydraulic block extending electrical connections (14) through insulators (22) secured within through bores (18) in said hydraulic block with an upper end of said electrical connections extending above said hydraulic block, forming a control device including a housing and a stamped screen (32) with conductive sheet metal strips that are insulated from each other by a plastic covering, during application of the plastic covering on said stamped screen (32) forming parallel spaced guide pins (50) that extend from said stamped screen (32), forming through slots (56) at opposite ends of said guide pins, applying a helical electrical conductor onto each of said separate guide pins (50) with first and second opposite ends of said helical electrical conductors extending through said slots (56) in opposite ends of said guides pins (50), extending a lower end of each of said guide pins partially into a blind bore (52) in said hydraulic block, connecting said first end of said helical electrical conductor onto said upper end of said electrical connections, securing said second end of said helical electrical conductors to conductor strips in said insulated stamped screens, forcing said control device toward said hydraulic block thereby forcing said lower ends of said guide pins into said blind bores (52), and then securing said control device and said cover (60) in place with said electrical connections within said cover (60).

* * * * *